US012280757B2

(12) United States Patent
Park et al.

(10) Patent No.: US 12,280,757 B2
(45) Date of Patent: Apr. 22, 2025

(54) ELECTRIC PARKING BRAKE AND METHOD FOR CONTROLLING THE SAME

(71) Applicant: HL MANDO CORPORATION, Pyeongtaek-si (KR)

(72) Inventors: Jaehyun Park, Seoul (KR); Chanwon Lee, Uiwang-si (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 231 days.

(21) Appl. No.: 17/852,560

(22) Filed: Jun. 29, 2022

(65) Prior Publication Data
US 2023/0001894 A1    Jan. 5, 2023

(30) Foreign Application Priority Data

Jul. 2, 2021    (KR) .................. 10-2021-0087258

(51) Int. Cl.
B60T 8/17    (2006.01)
B60T 13/74   (2006.01)

(52) U.S. Cl.
CPC ............. *B60T 8/17* (2013.01); *B60T 13/741* (2013.01)

(58) Field of Classification Search
CPC .......... B60T 8/17; B60T 13/741; B60T 13/74; B60T 1/06; B60T 13/745; B60T 17/22; F16D 66/00; F16D 66/026

See application file for complete search history.

(56) References Cited

U.S. PATENT DOCUMENTS

| 2006/0170282 A1* | 8/2006 | Yamaguchi | F16D 65/18 188/1.11 R |
| 2014/0000990 A1* | 1/2014 | Shiraki | F16D 65/567 188/71.8 |
| 2014/0165350 A1* | 6/2014 | O'Neil | B24B 39/00 29/90.01 |
| 2015/0360671 A1* | 12/2015 | Williams | B60T 17/221 701/70 |

(Continued)

FOREIGN PATENT DOCUMENTS

| DE | 10322451 | 12/2004 |
| DE | 102009037382 | 2/2011 |

(Continued)

OTHER PUBLICATIONS

Deutsches Patent—und Markenamt Application No. 102022116444.6, Office Action dated Dec. 9, 2024, 4 pages.

*Primary Examiner* — Khoi H Tran
*Assistant Examiner* — Dairon Estevez
(74) *Attorney, Agent, or Firm* — LEE, HONG, DEGERMAN, KANG & WAIMEY

(57) ABSTRACT

Disclosed herein an electric parking brake (EPB) system includes an EPB configured to provide a clamping force to a vehicle for parking; and a controller configured to engage the EPB; wherein the controller is configured to determine whether the vehicle is in an early stage of vehicle release or an early stage of brake pad replacement based on a driving distance and brake pad replacement information of the vehicle during a parking operation, and upon determining that the vehicle is in the early stages of vehicle release or brake pad replacement, compensate for a target clamping force of the EPB and perform the parking operation based on the compensated target clamping force.

12 Claims, 8 Drawing Sheets

(56) References Cited

U.S. PATENT DOCUMENTS

2018/0208170 A1\* 7/2018 Hanzawa ................ F16D 65/18
2019/0381987 A1\* 12/2019 Michels ................ F16D 66/022

FOREIGN PATENT DOCUMENTS

| FR | 2973764 A1 \* | 10/2012 | ............ B60T 13/588 |
| JP | 2006137257 A \* | 6/2006 | |
| JP | 2007-230434 A | 9/2007 | |
| JP | 2008-201388 A | 9/2008 | |
| JP | 2008239006 A \* | 10/2008 | |
| JP | 5022915 B2 \* | 9/2012 | ............ B60T 13/741 |

\* cited by examiner

ELECTRIC PARKING BRAKE AND METHOD FOR CONTROLLING THE SAME

CROSS-REFERENCE TO RELATED APPLICATION(S)

This application is based on and claims priority under 35 U.S.C. § 119 to Korean Patent Application No. 10-2021-0087258, filed on Jul. 2, 2021 in the Korean Intellectual Property Office, the disclosure of which is incorporated herein by reference in its entirety.

TECHNICAL FIELD

The disclosure relates to an electric parking brake (EPB) system for controlling operation or release of the EPB and a method for controlling the same.

BACKGROUND

In general, a Motor-On-Caliper (MOC) type of an EPB system increases a torque generated from an electric motor of the EPB through a reducer to generate a clamping force required for parking by a mechanical structure device inside a caliper.

Such EPB systems press a pair of brake pads against a brake disk rotating together with a wheel of a vehicle by advancing a piston by an electric motor of the EPB during parking operation, thereby generating a clamping force. Furthermore, when parking is released, the EPB systems release the pressure of the brake pad from the brake disc by reversing the piston by the electric motor, thereby releasing the generated clamping force.

When replacing brake pads, burnishing is performed on the brake pads for uniform contact between the brake pads and the brake disc. Burnishing eliminates a high-pitched squealing sound between the brake pads and the brake disc and improves the clamping force, when parking is performed.

At an early stage of vehicle release or an early stage of brake pad replacement, the brake pads may not be sufficiently burnished, resulting in a low friction coefficient of the brake pads. Accordingly, a clamping force lower than a target clamping force may be generated during parking operation until the brake pads are sufficiently burnished, so that a slip (backward moving) of vehicle may occur during the parking operation.

SUMMARY

An aspect of the disclosure is to provide an EPB system capable of preventing a vehicle from slipping by compensating for a clamping force of the EPB according to a burnishing state of a brake pad, and a method of controlling the same.

Additional aspects of the disclosure will be set forth in part in the description which follows and, in part, will be obvious from the description, or may be learned by practice of the disclosure.

In accordance with an aspect of the disclosure, an electric parking brake (EPB) system includes an EPB configured to provide a clamping force to a vehicle for parking; and a controller configured to engage the EPB; wherein the controller is configured to determine whether the vehicle is in an early stage of vehicle release or an early stage of brake pad replacement based on a driving distance and brake pad replacement information of the vehicle during a parking operation, and upon determining that the vehicle is in the early stages of vehicle release or brake pad replacement, compensate for a target clamping force of the EPB and perform the parking operation based on the compensated target clamping force.

The EPB may be a motor-on-caliper type EPB or an electric drum brake.

The brake pad may be a brake lining when the EPB is the electric drum brake.

The controller may be further configured to increase the target clamping force of the EPB based on at least one of the number of parking operations of the EPB and the driving distance when compensating for the target clamping force.

The controller may be further configured to increase the target clamping force as the number of parking operations decreases or the driving distance decreases.

The controller may be further configured to increase the target clamping force according to the number of parking operations and the driving distance in response to the number of parking operations is being within a predetermined number range and the driving distance is within a predetermined distance range.

The controller may include a memory in which the number of parking operations is stored, and the number of parking operations stored in the memory is increased whenever the parking operation is performed.

The EPB system may be an electromechanical brake system that performs a parking brake function that maintains a stopped state of the vehicle when parking in addition to a service brake function that provides braking force in a driving situation of the vehicle.

In accordance with another aspect of the disclosure, a method of controlling an EPB system for controlling an EPB that provides a clamping force required for parking a vehicle includes determining whether the vehicle is in an early stage of vehicle release or an early stage of brake pad replacement based on a driving distance and brake pad replacement information of the vehicle during a parking operation; compensating for a target clamping force of the EPB upon determining that the vehicle is in the early stages of vehicle release or brake pad replacement; and performing the parking operation based on the compensated target clamping force.

The compensating for the target clamping force may further include increasing the target clamping force of the EPB based on at least one of the number of parking operations of the EPB and the driving distance.

The compensating for the target clamping force may further include increasing the target clamping force as the number of parking operations decreases or the driving distance decreases.

The compensating for the target clamping force may further include increasing the target clamping force according to the number of parking operations and the driving distance in response to the number of parking operations being within a predetermined number range and the driving distance is within a predetermined distance range.

The EPB may be a motor-on-caliper type EPB or an electric drum brake.

The brake pad may be a brake lining when the EPB is the electric drum brake.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
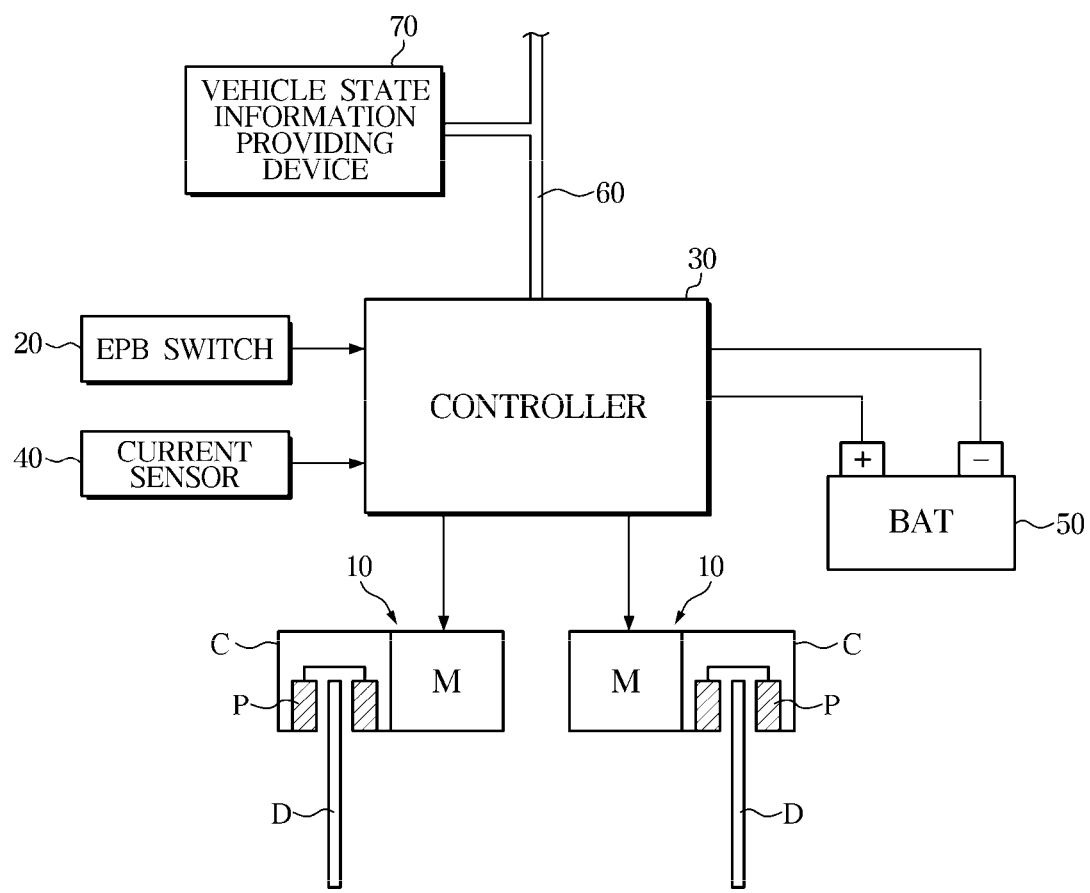
FIG. 1 shows a configuration view of an EPB system according to an embodiment of the disclosure.

Like numerals refer to like elements throughout the specification. Not all elements of embodiments of the disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a member is "on" another member, the member may be directly on the other member or a third member may be disposed therebetween.

Terms such as "~unit", "~group", "~block", "~member", and "~module" used in the specification may be implemented in software or hardware. Terms such as "~unit", "~group", "~block", "~member", and "~module" may refer to a unit that processes at least one function or operation. Furthermore, terms such as "~unit", "~group", "~block", "~member", and "~module" are used in at least one piece of hardware such as a field-programmable gate array (FPGA)/application specific integrated circuit (ASIC), or at least one software or processor stored in a memory.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, operating principles and embodiments of the disclosure will be described with reference to the accompanying drawings.

FIG. 1 is a view illustrating a configuration diagram of an electric parking brake (EPB) system according to an embodiment of the disclosure.

Referring to FIG. 1, the EPB system may include an EPB 10, an EPB switch 20, a controller 30, and a current sensor 40.

The EPB 10 may provide a parking braking force to a brake disc rotating together with left and right rear wheels of a vehicle.

The EPB 10 generates a clamping force, which is a fastening force for parking, for each rear wheel. The EPB 10 is controlled by the controller 30 electronically connected thereto.

The EPB 10 is operated by an electric motor M to generate a clamping force. The EPB 10 drives the electric motor M to press a brake pad P of a brake caliper C on the left and right rear wheels against the brake disc D, thereby generating a clamping force.

Figure 2:
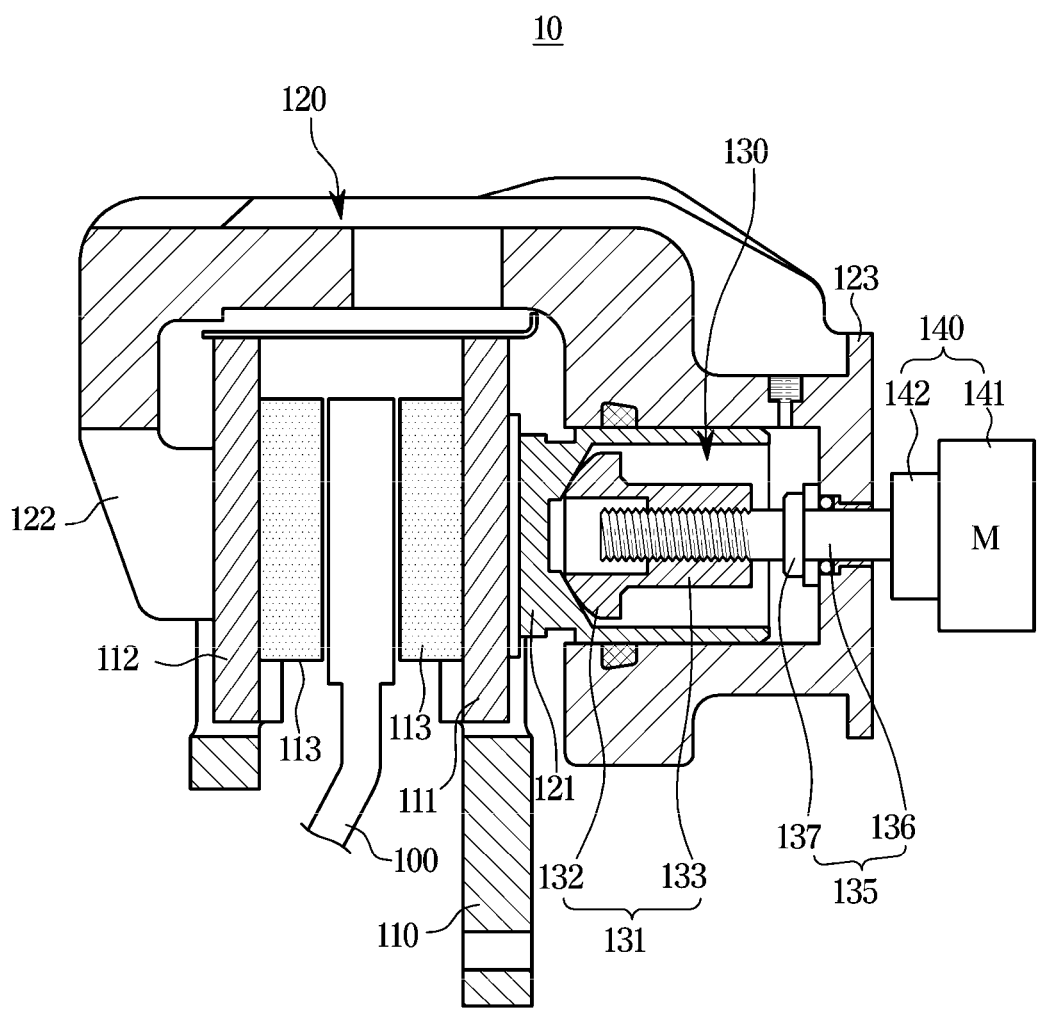
FIG. 2 shows an EPB applied to the EPB system according to an embodiment of the disclosure.

FIG. 2 is a view an EPB applied to the EPB system according to the embodiment of the disclosure.

Referring to FIG. 2, the EPB 10 may include a carrier 110 on which a pair of pad plates 111 and 112 are installed to move forward and backward to press a brake disk 100 rotating together with wheels of the vehicle, a caliper housing 120 provided with a cylinder 123 slidably installed on the carrier 110 and installed so that a piston 121 may move forward and backward by a braking hydraulic pressure, a power transmission unit 130 that presses the piston 121, and a motor actuator 140 that transmits a rotational force to the power transmission unit 130 by using a motor M.

The pair of pad plates 111 and 112 may include an inner pad plate 111 disposed in contact with the piston 121 and an outer pad plate 112 disposed in contact with a finger part 122 of the caliper housing 120. The pair of pad plates 111 and 112 are installed on the carrier 110 fixed to a vehicle body so as to move forward and backward toward opposite sides of the brake disc 100. Furthermore, a brake pad 113 is attached to one surface of each of the pad plates 111 and 112 facing the brake disc 100.

The caliper housing 120 is slidably installed on the carrier 110. In particular, the caliper housing 120 includes the cylinder 123 in which the power transmission unit 130 is installed on a rear portion thereof and the piston 121 is embedded so as to move forward and backward, and the finger part 122 bent downward to operate the outer pad plate 112 on a front portion thereof. The finger part 122 and the cylinder 123 are integrally formed.

The piston 121 is provided in a cylindrical with a cup-shaped thereinside and is slidably inserted into the cylinder 123. The piston 121 presses the inner pad plate 111 toward the brake disc 100 by an axial force of the power transmission unit 130 receiving a rotational force of the motor actuator 140. Accordingly, when the axial force of the power transmission unit 130 is applied, the piston 121 advances toward the inner pad plate 111 to press the inner pad plate 111, and in turn the caliper housing 120 operates in a opposite direction to the piston 121 by a reaction force such that the finger part 122 presses the outer pad plate 112 toward the brake disc 100, thereby performing braking operation.

The power transmission unit 130 may serve to receive the rotational force from the motor actuator 140 to press the piston 121 toward the inner pad plate 111.

The power transmission unit 130 may include a nut member 131 that is installed to be disposed inside the piston 121 and is in contact with the piston 121, and a spindle member 135 screw-coupled to the nut member 131.

The nut member 131 may be disposed inside the piston 121 in a state in which rotation thereof is restricted, and may be screw-coupled to the spindle member 135.

The nut member 131 may include a head portion 132 provided to be in contact with the piston 121, and a coupling portion 133 extending from the head portion 132 and having a female thread on an inner circumferential surface so as to be screw-coupled with the spindle member 135.

The nut member 131 moves in a forward direction or a reverse direction according a rotational direction of the spindle member 135 and may serve to press and release the piston 121. In this case, the forward direction may be a movement direction in which the nut member 131 approaches the piston 121. The backward direction may be a movement direction in which the nut member 131 moves away from the piston 121. Furthermore, the forward direction may be a movement direction in which the piston 121 approaches the brake pad 113. The backward direction may be a movement direction in which the piston 121 moves away from the brake pad 113.

The spindle member 135 may include a shaft portion 136 that passes through the rear portion of the caliper housing 120 and rotates by receiving the rotational force of the motor actuator 140, and a flange portion 137 extending radially from the shaft portion 136. One side of the shaft portion 131 may be rotatably installed through a rear side of the cylinder 123, and the other side thereof may be disposed inside the piston 121. At this time, the one side of the shaft portion 131 passing through the cylinder 123 is connected to an output shaft of a reducer 142 to receive the rotational force of the motor actuator 140.

The motor actuator 140 may include an electric motor 141 and the reducer 142.

The electric motor 141 may press and release the piston 121 by rotating the spindle member 135 to move the nut member 131 forward and backward.

The reducer 142 may be provided between an output side of the electric motor 141 and the spindle member 135.

By the above configuration, the EPB 10 moves the nut member 131 by rotating the spindle member 135 in one direction using the motor actuator 140 during a parking operation, thereby pressing the piston 121. The piston 121 pressed by the movement of the nut member 131 presses the inner pad plate 111 to bring the brake pad 113 into close contact with the brake disc 100, thereby performing a fastening operation generating a clamping force.

Furthermore, the EPB 10 rotates the spindle member 135 in the opposite direction using the motor actuator 140 during a parking release operation, so that the nut member 131 pressed by the piston 121 moves backward. In other words, the pressure on the piston 121 may be released by the retreat movement of the nut member 131, which causes the clamping force generated by the brake pad 113 being spaced apart from the brake disc 100 to be released, thereby performing a fastening release operation.

Referring back to FIG. 1, the EPB switch 20 is a switch for receiving a driver's intention to operate the EPB 10, and may be provided near a driver seat of the vehicle.

The EPB switch 20 is provided to be turned on or off by the driver.

The EPB switch 20 transmits a signal corresponding to a parking operation instruction (a clamping command) to the controller 30 in an on operation, and a signal corresponding to a parking release instruction (a clamping release command) in an off operation.

The controller 30 may engage or disengage (or fasten/unfasten) the EPB 10 by an operation signal of the EPB switch 20 or an operation signal generated by a program related to operation of the EPB.

The current sensor 40 may be provided to detect a current flowing through the electric motors M and 141 of the EPB 10. The current sensor 40 may detect a motor current flowing through the electric motors M and 141 using a shunt resistor or a Hall sensor. In addition to the shunt resistor or the Hall sensor, the current sensor 40 may use various methods capable of detecting the motor current.

The controller 30 may determine whether a current clamping force reaches a target clamping force based on the motor current detected by the current sensor 40 during the parking operation.

The controller 30 receives power from a battery 50.

The controller 30 supplies power supplied from the battery 50 to the electric motors M and 141 of the EPB 10 to drive the electric motors M and 141, thereby generating a clamping force. When the clamping force is generated or released by driving the electric motors M and 141 of the EPB 10, the controller 30 may supply and block power to the electric motors M and 141.

The controller 30 is connected to a network bus 50 used for network communication with a vehicle state information providing device 70 that provides a driving distance of a vehicle and whether or when to replace the brake pad 113 of the EPB 10.

The controller 30 may communicate with the vehicle state information providing device 70 through the network bus 60.

The controller 30 may exchange data with the vehicle state information providing device 70 through Ethernet, Media Oriented Systems Transport (MOST), Flexray, Controller Area Network (CAN), and Local Interconnect Network (LIN), and the like.

The controller 30 may receive information related to a driving distance of the vehicle and whether or when to replace the brake pad 113 of the EPB 10 from the vehicle state information providing device 70.

Figure 3:
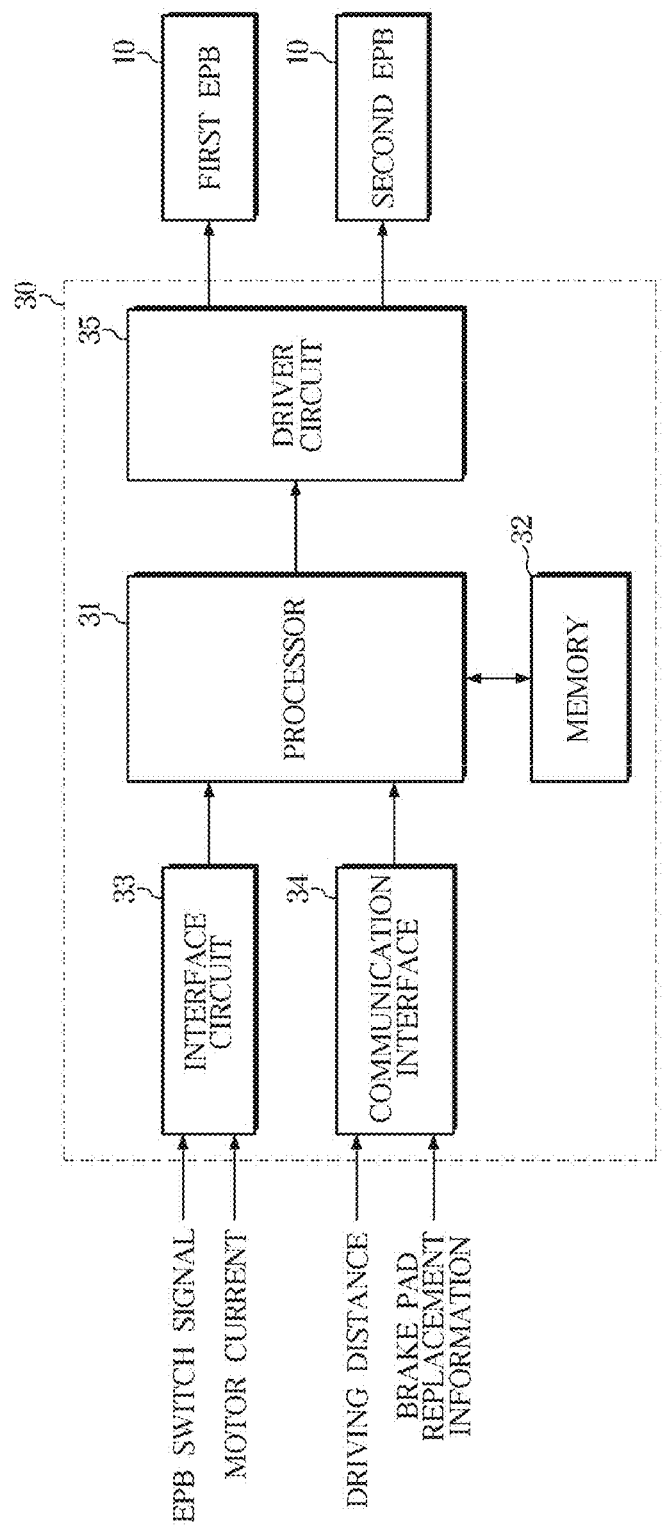
FIG. 3 shows a control block of the EPB system according to an embodiment of the disclosure.

FIG. 3 is a view illustrating a control block of the EPB system according to an embodiment of the disclosure.

Referring to FIG. 3, the controller 30 may be referred to as an Electronic Control Unit (ECU).

The controller 30 may include a processor 31, a memory 32, an interface circuit 33, a communication interface 34, and a driver circuit 35.

The processor 31 may control overall operation of the EPB system.

The memory 32 may store a program for processing or controlling the processor 31 and various data for operation of the EPB system.

The memory 32 may include not only volatile memories such as Static Random Access Memory (S-RAM) and Dynamic Random Access Memory (D-RAM), but also non-volatile memories such as a flash memory, read only memory (ROM), erasable programmable read only memory (EPROM), and the like.

The interface circuit 33 may receive signals from various switches and sensors connected to the EPB system. The interface circuit 33 may receive the EPB switch signal and the motor current from the EPB switch 20 and the current sensor 40.

The communication interface 34 communicates with various systems in the vehicle, including the vehicle state information providing device 70. The communication interface 34 communicates with the vehicle state information providing device 70 to receive information related to the driving distance of the vehicle, whether or when to replace the brake pad 113 of the EPB 10 from the vehicle state information providing device 70.

The driver circuit 35 supplies current to the motors M and 141 of first and second EPB 10 in response to the control signal of the processor 31 and controls the direction of the current to rotate the motors M and 141 forwardly or reversely. As the motor M and 141 rotates forward or reverse, the brake pad 113 is moved toward the brake disk 100 or the opposite side thereof to generate or release a clamping force. As a result, the EPB 10 is fastened or unfastened.

The processor 31 may rotate forward or reverse the electric motor 141 of the EPB 10 through the driver circuit 35 during parking operation or parking release operation.

The processor 31 may perform a parking operation mode or a parking release operation mode in response to the operation signal of the EPB switch 20 operated by a driver or the operation signal generated by a program related to the operation of the EPB.

The processor 31 moves the nut member 131 forward to press the piston 121 by rotating the electric motor 141 in one direction in the parking operation mode, which causes the brake pad 113 to come into close contact with the brake disc 100, thereby performing the parking operation (also referred to as Parking Apply) that generates a parking braking force.

The processor 31 moves the nut member 131 backward to release the pressure of the piston 121 by rotating the electric motor 141 in the opposite direction in the parking release operation mode, which causes the brake pad 113 in close contact with the brake disc 100 to release from the brake disc, thereby performing the parking release operation (also referred to as Parking Release) that releases a parking braking force.

The processor 31 may record the number of times the parking operation is operated in the memory 32 whenever the parking operation is performed.

The processor 31 may recognize a total number of parking operations by accumulating the recorded number of parking operations.

The processor 31 may recognize the driving distance by receiving the driving distance from the vehicle state information providing device 70.

The processor 31 may determine from the driving distance whether a current driving distance is an early stage of vehicle release that is within a predetermined driving distance after the vehicle is released.

The processor 31 may receive brake pad replacement information (whether or not to replace the brake pad and when to replace the brake pad) from the vehicle state information providing device 70 to determine whether to replace the brake pad and when to replace the brake pad. The processor 31 may determine, from whether or when to replace the brake pad, whether a current time is an early stage of the brake pad replacement that is within a predetermined time period after the brake pad 113 is replaced.

In the early stage of vehicle release or the early stage of the brake pad replacement, the processor 31 determines that compensation of the clamping force of the EPB 10 is required by determining that the brake pad 113 is close to a new product and thus sufficiently burnishing is not performed.

In response to determining that the compensation of the clamping force in the EPB 10 is required, the processor 31 compensates the target clamping force in a manner of increasing the clamping force of the EPB 10.

The processor 31 performs the parking operation in response to the compensated target clamping force.

Figure 4:
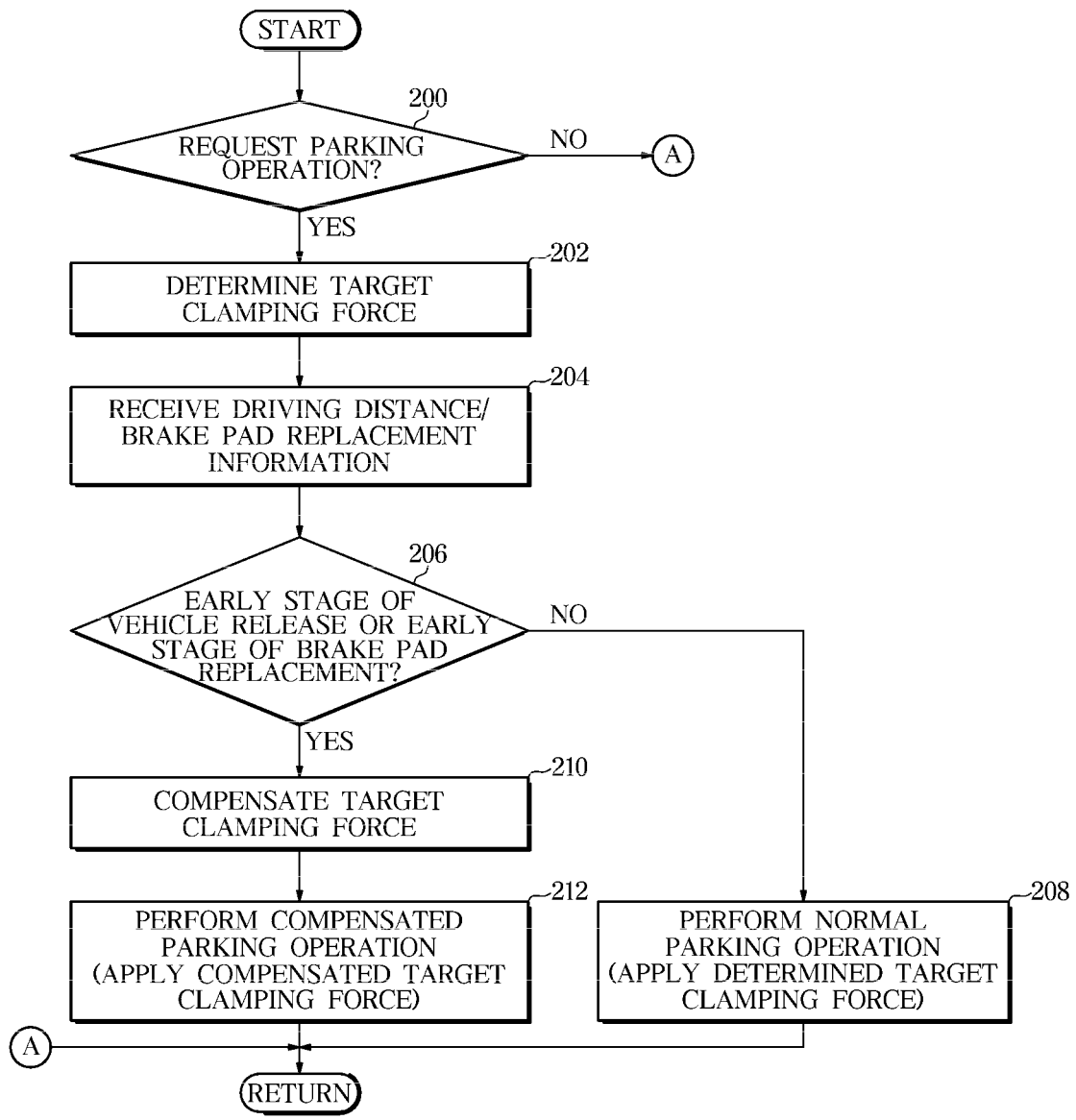
FIG. 4 shows a control method of the EPB system according to an embodiment of the disclosure.

FIG. 4 is a view illustrating a control method of the EPB system according to an embodiment of the disclosure Referring to FIG. 4, the EPB system may determine whether the parking operation is requested (200), determine the target clamping force in response to the parking operation being requested (202), receive driving distance and/or brake pad replacement information (204), determine whether the vehicle is in the early stages of vehicle release or brake pad replacement from the received driving distance and/or brake pad replacement information (206), perform a normal parking operation by applying the determined target clamping force in response to determining that the vehicle is not in the early stages of vehicle release or brake pad replacement (208), compensate for the determined target clamping force in response to determining that the vehicle is in the stages of vehicle release or brake pad replacement (210), perform a compensated parking operation by applying the compensated target clamping force (212).

In response to the EPB switch 30 being turned on, the controller 30 may determine that the parking operation is requested.

The controller 30 may determine the target clamping force according to vehicle environments such as an inclination of the vehicle or a battery voltage. The controller 30 may determine the target clamping force according to the vehicle environments based on a well-known technologies.

The controller 30 determines whether the vehicle is in the stages of vehicle release or brake pad replacement from the received driving distance and/or pad replacement information.

The controller 30 may determine whether the early stage of vehicle release is or not in response to the current driving distance being within the predetermined driving distance after the vehicle is released.

The controller 30 may determine whether the early stage of brake pad replacement is or not in response to the current time being within the predetermined time after the brake pad 113 is replaced.

The controller 30 performs the normal parking operation by applying the determined target clamping force in response to the vehicle not being in the early stages of vehicle release or brake pad replacement. The normal parking operation refers to parking operation of the EPB 10 until the clamping force of the EPB 10 reaches the determined target clamping force. The controller 30 may rotate forward the electric motor 141 until the current of the electric motor 141 of the EPB 10 reaches a target current corresponding to the determined target clamping force.

In response to the vehicle being in the early stages of vehicle release or brake pad replacement, the controller 30 compensates the determined target clamping force by determining that sufficient burnishing is not performed on the brake pad 113, and perform the compensated parking operation by applying the compensated target clamping force (202). The compensation parking operation is to perform parking operation of the EPB 10 until the clamping force of the EPB 10 reaches the compensated target clamping force. The controller 30 may rotate forward the electric motor 141 until the current of the electric motor 141 of the EPB 10 reaches the target current corresponding to the compensated target clamping force.

Figure 5:
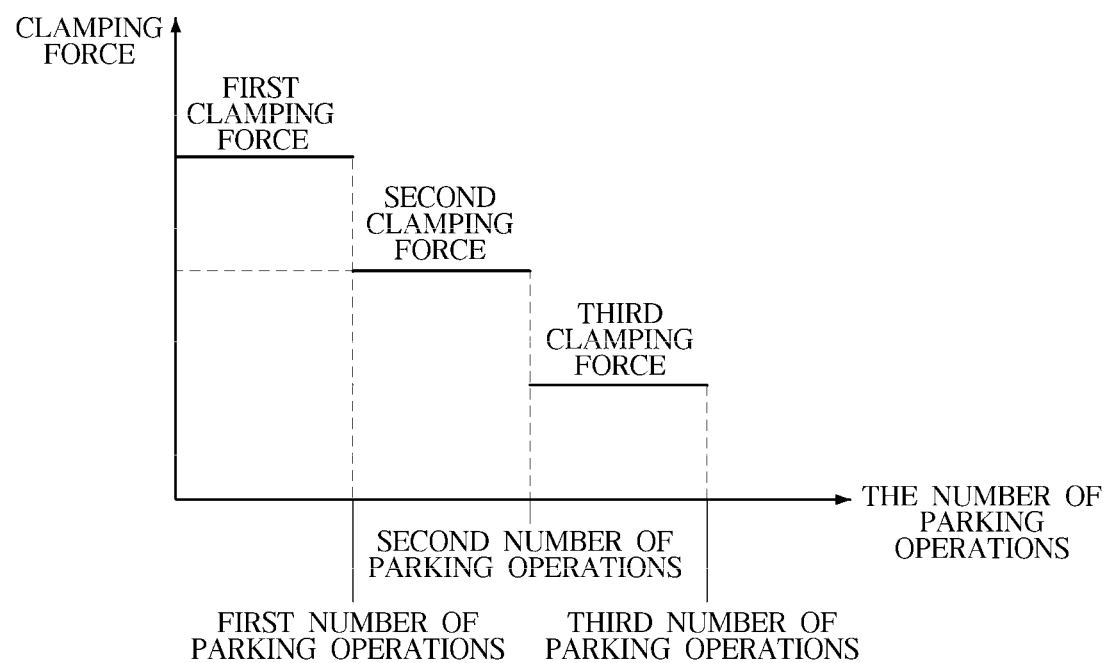
FIG. 5 shows compensating for a target clamping force according to the number of parking operations in the EPB system according to the embodiment.

FIG. 5 is a view illustrating compensating for the target clamping force according to the number of parking operations in the EPB system according to an embodiment of the disclosure.

Referring to FIG. 5, a horizontal axis represents the number of parking operations, and a vertical axis represents the clamping force.

The lower the number of parking operations is, the higher the clamping force is, and the higher the number of parking operations is, the lower the clamping force is.

A first clamping force is set in a first section in which the number of parking operations is lower than the first number of parking operations. The first clamping force may be a maximum clamping force that may be generated in the specification of the EPB 10.

A second clamping force set to be lower than the first clamping force is set in a second section in which the number of parking operations is between the first number of parking operations and the second number of parking operations.

A third clamping force set to be lower than the second clamping force is set in a third section in which the number of parking operations is greater than the second number of parking operations.

When the number of parking operations is the first section lower than the first number of parking operations during the compensation of the target clamping force, the target clamping force is increased to the first clamping force.

When the number of parking operations is the second section between the first number of parking operations and the second number of parking operations during the compensation of the target clamping force, the target clamping force is increased to the second clamping force set to be lower than the first clamping force.

When the number of parking operations is the third section greater than the second number of parking operations during the compensation of the target clamping force, the target clamping force is increased to the third clamping force set lower than the second clamping force.

Meanwhile, when the second and third clamping forces are set to be relatively low compared to the maximum clamping force, the target clamping force may be higher than the second clamping force or the third clamping force depending on the vehicle environment. For this case, when the target clamping force is compensated, the target clamping force before and after compensation is compared, and when the target clamping force before compensation is higher than the target clamping force after compensation, the target clamping force before compensation may be determined as the compensated target clamping force.

Figure 6:
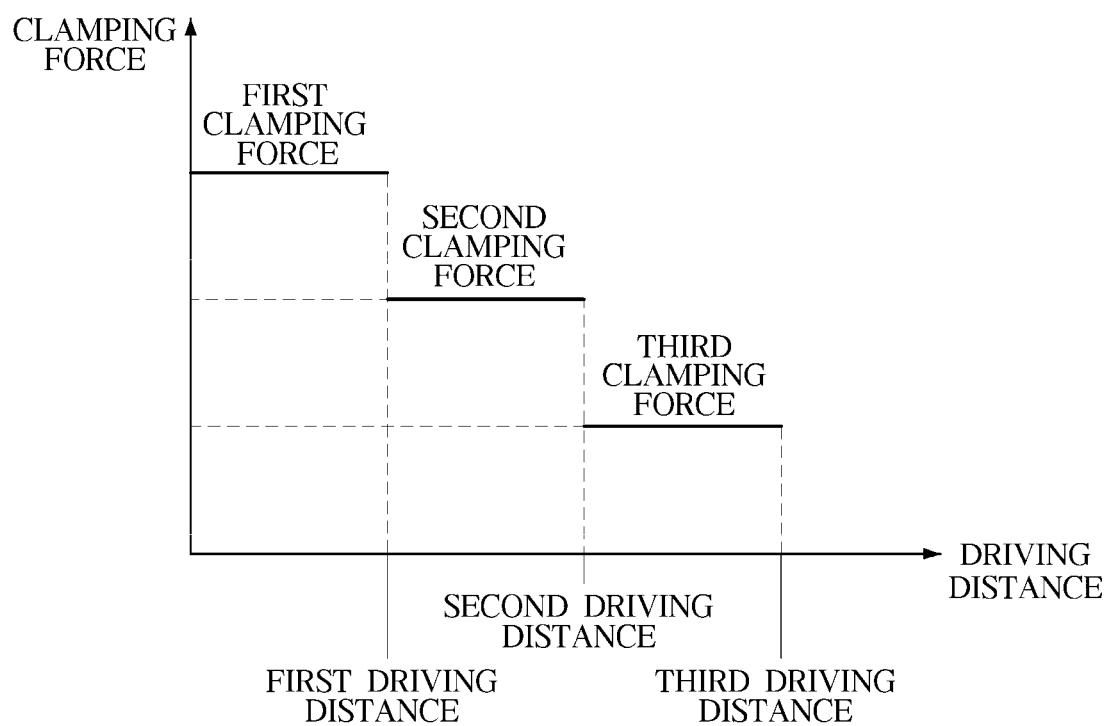
FIG. 6 shows compensating a target clamping force according to a driving distance in the EPB system according to another embodiment.

FIG. 6 is a view illustrating compensating the target clamping force according to the driving distance in the EPB system according to another embodiment of the disclosure.

Referring to FIG. 6, a horizontal axis represents the driving distance, and a vertical axis represents the clamping force.

The lower the driving distance, the higher the clamping force, and the higher the driving distance, the lower the clamping force.

The first clamping force is set in a first section in which the driving distance is lower than a first driving distance. The first clamping force may be the maximum clamping force that may be generated in the specification of the EPB 10.

The second clamping force set to be lower than the first clamping force is set in a second section in which the driving distance is between first and second driving distances.

A third clamping force set to be lower than the second clamping force is set in a third section in which the driving distance is greater than the second driving distance.

When the driving distance is the first section lower than the first driving distance during the compensation of the target clamping force, the target clamping force is increased to the first clamping force.

When the driving distance is the second section between the first driving distance and the second driving distance during the compensation of the target clamping force, the target clamping force is increased to the second clamping force set to be lower than the first clamping force.

When the driving distance is the third section greater than the second driving distance during the compensation of the target clamping force, the target clamping force is increased to the third clamping force set to be lower than the second clamping force.

Figure 7:
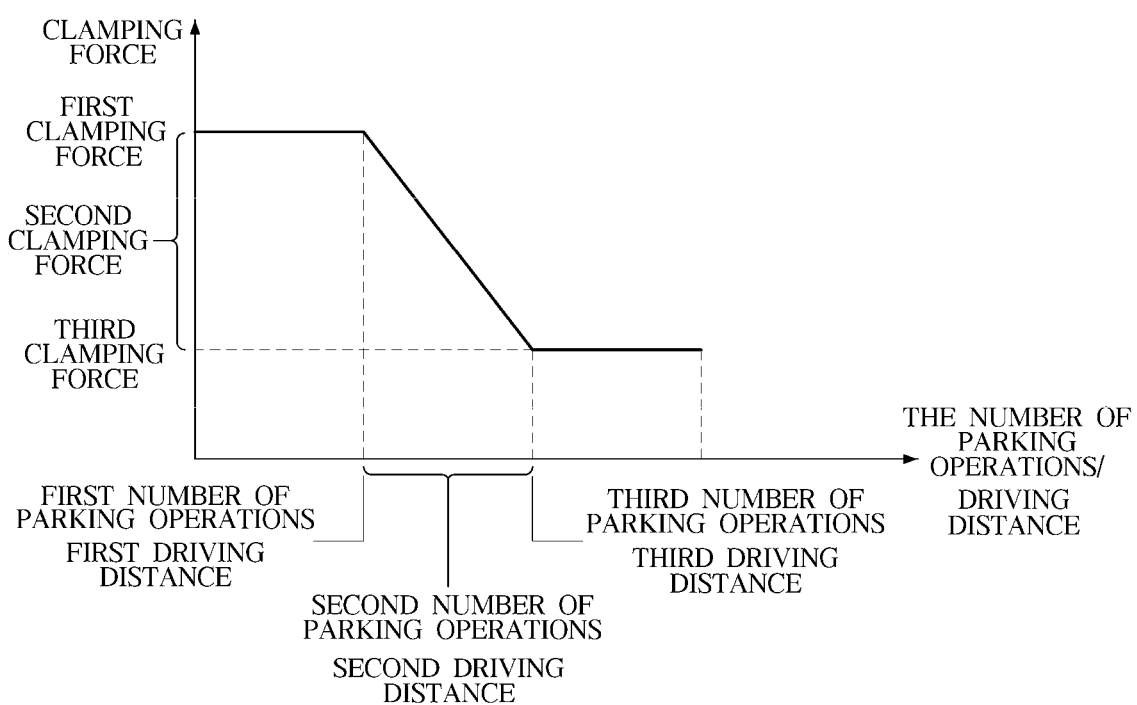
FIG. 7 shows compensating a target clamping force according to the number of parking operations and a driving distance in the EPB system according to another embodiment.

FIG. 7 is a view illustrating compensating the target clamping force according to the number of parking operations and the driving distance in the EPB system according to another embodiment of the disclosure.

Referring to FIG. 7, both the number of parking operations and the driving distance may be considered when compensating for the target clamping force.

The number of parking operations and the driving distance may have different weights.

As the number of parking operations and the driving distance are lower, the target clamping force is increased to the first clamping force to compensate, and as the number of parking operations and the driving distance are higher, the target clamping force is increased to the third clamping force to compensate.

In the sections in which the number of parking operations is between the first number of parking operations and the third number of parking operations and the driving distance is between the first driving distance and the third driving distance, the second clamping force may decrease linearly between the first clamping force and the third clamping force. In other words, the second clamping force may be more precisely adjusted in response to the number of parking operations and the driving distance.

As described above, an embodiment of the disclosure may compensate for the clamping force of the EPB in response to the burnishing state of the brake pad in the EPB, thereby preventing the vehicle from rolling back due to a slip of the brake.

Hereinafter, it will be described that the EPB system is an electric drum brake.

Figure 8:
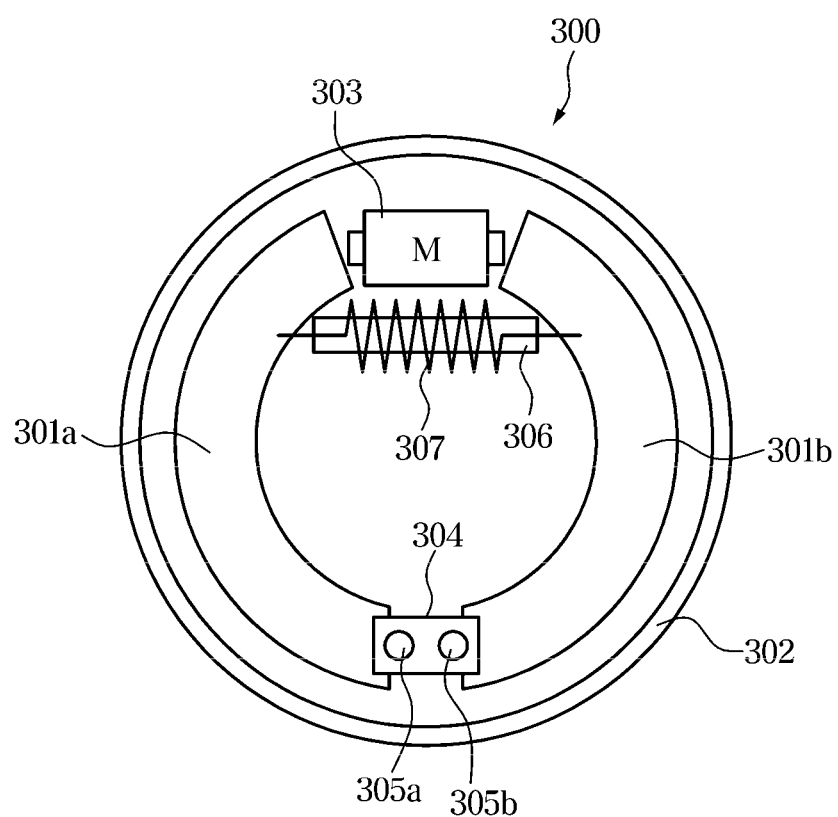
FIG. 8 shows a drum type EPB applied to the EPB system according to another embodiment.

FIG. 8 is a view illustrating a drum type EPB applied to an EPB system according to another embodiment of the disclosure.

Referring to FIG. 8, the electric drum brake 300 applied to the EPB system has a drum 302 rotating together with wheels and a pair of brake shoes 301*a* and 301*b* that is provided in the drum and to which a brake lining (or brake pad) is attached, expanding the pair of brake shoes to perform braking. Generally, the electric drum brake 300 is often mounted on rear wheels of the vehicle.

More specifically, the electric drum brake 300 may include the pair of brake shoes 301*a* and 301*b* forming an arc-shaped shape movably installed along a surface of a backing plate coupled to the vehicle body, and the drum 302 having a friction surface on an inner circumferential thereof and rotating together with the wheel, and an electric actuator 303 that applies a force to each of the brake shoes 301*a* and 301*b* in a direction of extending the pair of brake shoes 301*a* and 301*b*.

The pair of brake shoes 301a and 301b are connected to the electric actuator 303 installed on the backing plate at one end opposite to each other, respectively. The other end of the pair of brake shoes 301a and 301b, which is located on the opposite side of the one end connected to the electric actuator 303, are connected to pins 305a and 305b of an anchor member 304 fixed to the backing plate, respectively. As a result, the brake shoes 301a and 301b do not rotate together with the drum 302.

A strut 306 and a spring 307 are provided between the pair of brake shoes 301a and 301b. The strut 306 serves as an adjuster for adjusting the gap between the pair of brake linings and the friction surface of the drum 302 as the brake linings wear. Furthermore, brake shoes 301a and 301b are fixed to opposite ends of the spring 307, respectively, and the pair of brake shoes 301a and 301b are arranged to be close to each other.

The electric actuator 303 includes an electric motor M, a reducer, and a pressing mechanism using a ball screw mechanism. As the electric motor M rotates in one direction, the output shaft thereof rotates and at the same time, the rotation thereof is reduced by the reducer. Furthermore, rotational motion of the output shaft is converted into a linear motion by the ball screw mechanism, so that the pair of brake shoes 301a and 301b are respectively pressed in a direction away from each other. Accordingly, the pair of brake shoes 301a and 301b to which the brake lining is attached presses the drum 302 to generate a braking force. Meanwhile, when the electric motor M rotates in the opposite direction, the pair of brake shoes 301a and 301b to which the brake lining is attached, which is pressing the drum 302, is separated from the drum 302, thereby releasing braking force.

The controller 30 controls the clamping force of the electric drum brake 300 in the same manner as the EPB 10. For example, the controller 30 controls the electric motor M of the electric drum brake 300 to operate the electric drum brake. In other words, the controller 30 determines whether the vehicle is in the early stages of vehicle release or brake pad (or brake lining) replacement based on the driving distance of the vehicle and the brake pad (or brake lining) replacement information during the parking operation, and in response to determining that the vehicle is in the early stages of vehicle release or brake pad (or brake lining) replacement, compensates for the target clamping force of the electric drum brake 300 and performs the parking operation according to the compensated target clamping force.

Meanwhile, in the above-described embodiments, the EPB system having a motor-on-caliper type EPB or an electric drum brake has been described, but the disclosure is not limited thereto. The EPB system may be an electromechanical brake system that performs a parking brake function that maintains a stopped state of the vehicle when parking in addition to a service brake function that provides braking force in a driving situation of the vehicle.

As is apparent from the above, an embodiment of the disclosure may compensate for the clamping force of the EPB according to the burnishing state of the brake pad of the EPB to prevent the vehicle from rolling back due to a slip of the brake.

On the other hand, the aforementioned controller and/or its components may include one or more processor/microprocessor(s) coupled with a computer-readable recording medium storing computer-readable code/algorithm/software. The processor/microprocessor(s) may execute the computer-readable code/algorithm/software stored in the computer-readable recording medium to perform the above-described functions, operations, steps, and the like.

The above-described controller and/or its components may further include a memory implemented as a computer-readable non-transitory recording medium or a computer-readable temporary recording medium. The memory may be controlled by the aforementioned controller and/or its components, configured to store data transmitted to or received from the aforementioned controller and/or its components or by the above-described controller and/or its components, and configured to store data to be processed or to be processed.

The disclosed embodiment can also be implemented as computer-readable code/algorithm/software on a computer-readable recording medium. The computer-readable recording medium may be a computer-readable non-transitory recording medium such as a data storage device capable of storing data readable by a processor/microprocessor. Examples of computer-readable recording media include hard disk drives (HDDs), solid state drives (SSDs), silicon disk drives (SDDs), read-only memory (ROM), CD-ROMs, magnetic tapes, floppy disks, optical data storage devices, and the like.

What is claimed is:

1. An electric parking brake (EPB) system, comprising:
an EPB configured to provide a clamping force to a vehicle for parking; and
a controller configured to engage the EPB;
wherein the controller is configured to:
determine, during a parking operation of the vehicle, whether the vehicle is operating in a predetermined time immediately following a brake pad replacement based on a driving distance of the vehicle and brake pad replacement information of the vehicle, and
upon determining that the vehicle is operating in the predetermined time immediately following the brake pad replacement, compensate for a target clamping force of the EPB, and perform the parking operation based on the compensated target clamping force,
the controller compensates for a target clamping force by increasing the target clamping force of the EPB based on at least one of a number of parking operations of the EPB and the driving distance when compensating for the target clamping force.

2. The electric parking brake system of claim 1, wherein the EPB is a motor-on-caliper type EPB or an electric drum brake.

3. The electric parking brake system of claim 2, wherein the brake pad is a brake lining when the EPB is the electric drum brake.

4. The electric parking brake system of claim 1, wherein the controller is further configured to increase the target clamping force as the number of parking operations decreases or the driving distance decreases.

5. The electric parking brake system of claim 1, wherein the controller is further configured to increase the target clamping force according to the number of parking operations and the driving distance in response to the number of parking operations being within a predetermined number range and the driving distance is within a predetermined distance range.

6. The electric parking brake system of claim 1, wherein the controller comprises a memory in which the number of parking operations is stored, and the number of parking operations stored in the memory is increased whenever the parking operation is performed.

7. The electric parking brake system of claim 1, wherein the EPB system is an electromechanical brake system that performs a parking brake function that maintains a stopped state of the vehicle when parking in addition to a service brake function that provides braking force in a driving situation of the vehicle.

8. A method performed by a device for controlling an electric parking brake (EPB) system for controlling an EPB that provides a clamping force required for parking a vehicle, the method comprising:
   determining, during a parking operation of the vehicle, whether the vehicle is operating in a predetermined time immediately following a brake pad replacement based on a driving distance of the vehicle and brake pad replacement information of the vehicle;
   compensating for a target clamping force of the EPB upon determining that the vehicle is operating in the predetermined time immediately following the brake pad replacement; and
   performing the parking operation based on the compensated target clamping force,
   wherein the compensating for a target clamping force comprises increasing the target clamping force of the EPB based on at least one of a number of parking operations of the EPB and the driving distance.

9. The method of claim 8, wherein the compensating for the target clamping force further comprises increasing the target clamping force as the number of parking operations decreases or the driving distance decreases.

10. The method of claim 8, wherein the compensating for the target clamping force further comprises increasing the target clamping force according to the number of parking operations and the driving distance in response to the number of parking operations being within a predetermined number range and the driving distance is within a predetermined distance range.

11. The method of claim 8, wherein the EPB is a motor-on-caliper type EPB or an electric drum brake.

12. The method of claim 11, wherein the brake pad is a brake lining when the EPB is the electric drum brake.

* * * * *